(12) United States Patent
Park et al.

(10) Patent No.: US 7,459,323 B2
(45) Date of Patent: Dec. 2, 2008

(54) METHOD OF MANUFACTURING A THIN FILM TRANSISTOR ARRAY PANEL

(75) Inventors: Min-Wook Park, Yongin-si (KR); Sang-Jin Jeon, Suwon-si (KR); Jung-Joon Park, Cheonan-si (KR); Jeong-Young Lee, Yongin-si (KR); Bum-Ki Baek, Suwon-si (KR); Se-Hwan Yu, Seoul (KR); Sang-Ki Kwak, Suwon-si (KR); Han-Ju Lee, Seoul (KR); Kwon-Young Choi, Goyang-si (KR)

(73) Assignee: Samsung Electronics Co., Ltd. (KR)

( * ) Notice: Subject to any disclaimer, the term of this patent is extended or adjusted under 35 U.S.C. 154(b) by 273 days.

(21) Appl. No.: 11/512,805

(22) Filed: Aug. 30, 2006

(65) Prior Publication Data

US 2006/0289965 A1 Dec. 28, 2006

Related U.S. Application Data

(62) Division of application No. 10/926,719, filed on Aug. 26, 2004, now Pat. No. 7,119,368.

(30) Foreign Application Priority Data

Aug. 28, 2003 (KR) .................... 10-2003-0060011

(51) Int. Cl.
 *H01L 21/00* (2006.01)
(52) U.S. Cl. ............... 438/30; 438/34; 438/151; 257/72; 257/59; 257/E21.414; 349/43
(58) Field of Classification Search .......... 438/30, 438/34, 151; 257/59, 72, E21.414; 349/43
See application file for complete search history.

(56) References Cited

U.S. PATENT DOCUMENTS 638,383 A 12/1899 Duval (Continued)

FOREIGN PATENT DOCUMENTS

CN 1254948 A 5/2000

(Continued)

*Primary Examiner*—Douglas M. Menz
*Assistant Examiner*—Steven J. Fulk
(74) *Attorney, Agent, or Firm*—Cantor Colburn LLP

(57) ABSTRACT

A method of manufacturing a thin film transistor array panel is provided, which includes: forming a gate line on a substrate; depositing a gate insulating layer and a semiconductor layer in sequence on the gate line; depositing a lower conductive film and an upper conductive film on the semiconductor layer; photo-etching the upper conductive film, the lower conductive film, and the semiconductor layer; depositing a passivation layer; photo-etching the passivation layer to expose first and second portions of the upper conductive film; removing the first and the second portions of the upper conductive film to expose first and second portions of the lower conductive film; forming a pixel electrode and a pair of redundant electrodes on the first and the second portions of the lower conductive film, respectively, the redundant electrodes exposing a part of the second portion of the lower conductive film; removing the exposed part of the second portion of the lower conductive film to expose a portion of the semiconductor layer; and forming a columnar spacer on the exposed portion of the semiconductor layer.

15 Claims, 12 Drawing Sheets

U.S. PATENT DOCUMENTS

| | | | |
|---|---|---|---|
| 4,938,567 A * | 7/1990 | Chartier | 359/245 |
| 5,036,370 A * | 7/1991 | Miyago et al. | 257/72 |
| 5,132,745 A * | 7/1992 | Kwasnick et al. | 257/412 |
| 5,559,345 A * | 9/1996 | Kim | 257/59 |
| 5,580,796 A * | 12/1996 | Takizawa et al. | 438/158 |
| 5,905,549 A * | 5/1999 | Lee | 349/42 |
| 6,091,465 A | 7/2000 | Lyu | |
| 6,338,989 B1 | 1/2002 | Ahn et al. | |
| 6,383,831 B2 * | 5/2002 | Kim | 438/34 |
| 6,654,094 B2 * | 11/2003 | Wu | 349/187 |
| 6,900,873 B2 * | 5/2005 | Yamazaki et al. | 349/152 |
| 2001/0019125 A1 * | 9/2001 | Hong et al. | 257/59 |
| 2001/0019129 A1 * | 9/2001 | You | 257/72 |
| 2001/0032981 A1 * | 10/2001 | Kong et al. | 257/72 |
| 2005/0158925 A1 | 7/2005 | Kim | 438/151 |

FOREIGN PATENT DOCUMENTS

| | | |
|---|---|---|
| JP | 11087721 | 3/1999 |
| JP | 2001-230321 | 8/2001 |
| JP | 2001-358343 | 12/2001 |
| JP | 2002314088 | 10/2002 |
| KR | 100192347 | 1/1999 |
| KR | 100205867 | 4/1999 |
| KR | 19990075407 | 10/1999 |
| KR | 1020010017422 | 3/2001 |
| KR | 1020010056769 | 7/2001 |
| KR | 100309210 | 9/2001 |
| KR | 1020020057032 | 7/2002 |
| KR | 1020020066573 | 8/2002 |
| KR | 1020020080866 | 10/2002 |

* cited by examiner

METHOD OF MANUFACTURING A THIN FILM TRANSISTOR ARRAY PANEL

CROSS REFERENCE TO RELATED APPLICATIONS

This application is a divisional application of U.S. application Ser. No. 10/926,719 filed Aug. 26, 2004 now U.S. Pat. No. 7,119,368, which claims priority to and the benefit of Korean Patent Application No. 10-2003-0060011, filed on Aug. 28, 2003, both of which are incorporated by reference herein in their entirety.

BACKGROUND OF THE INVENTION (a) Field of the Invention

The present invention relates to a thin film transistor array panel and a manufacturing method thereof.

(b) Description of the Related Art

A liquid crystal display (LCD) is one of the most widely used flat panel displays since it is lightweight and occupies less space than conventional cathode ray tube (CRT) displays. An LCD generally includes a liquid crystal (LC) layer that is interposed between a pair of panels including field-generating electrodes such as pixel electrodes and a common electrode. The LC layer is subjected to an electric field generated by the field-generating electrodes and variations in the field strength change the molecular orientation of the LC layer. For example, upon application of an electric field, the molecules of the LC layer change their orientation to change polarization of incident light. Appropriately arranged polarizers partially or fully block the light, creating gray or dark areas that can represent desired images.

One panel for the LCD generally includes a plurality of pixel electrodes, a plurality of thin film transistors (TFTs) for controlling signals to be applied to the pixel electrodes, a plurality of gate lines transmitting control signals for controlling the TFTs, and a plurality of data lines transmitting data voltages to be supplied to the pixel electrodes. The other panel generally includes a common electrode disposed on an entire surface thereof.

The TFT array panel including the TFTs includes several conductive films and insulting films. The gate lines, the data lines, and the pixel electrodes are formed of different films and they are separated by insulating films and sequentially arranged from bottom to top.

The TFT array panel is manufactured by several steps of film deposition and photolithography steps. Accordingly, it is important to obtain stable elements using a minimum process steps.

SUMMARY OF THE INVENTION

A motivation of the present invention is to solve the problems of the conventional art.

A method of manufacturing a thin film transistor array panel is provided, which includes: forming a gate line on a substrate; depositing a gate insulating layer and a semiconductor layer in sequence on the gate line; depositing a lower conductive film and an upper conductive film on the semiconductor layer; photo-etching the upper conductive film, the lower conductive film, and the semiconductor layer; depositing a passivation layer; photo-etching the passivation layer to expose first and second portions of the upper conductive film; removing the first and the second portions of the upper conductive film to expose first and second portions of the lower conductive film; forming a pixel electrode and a pair of redundant electrodes on the first and the second portions of the lower conductive film, respectively, the redundant electrodes exposing a part of the second portion of the lower conductive film; removing the exposed part of the second portion of the lower conductive film to expose a portion of the semiconductor layer; and forming a columnar spacer on the exposed portion of the semiconductor layer.

The photo-etching of the passivation layer may include: exposing the first portion of the upper conductive film and a portion of the gate insulating layer adjacent to the first portion. The exposed portion of the gate insulating layer may be covered with the pixel electrode along with the first portion of the lower conductive film.

The photo-etching of the passivation layer may further include: exposing a third portion of the upper conductive film. The removal of the first and the second portions of the upper conductive film may include: removing the third portion of the upper conductive film to expose a third portion of the lower conductive film.

The gate line may include a lower film and an upper film. The photo-etching of the passivation layer may further include: etching the gate insulating layer to expose a portion of the upper film of the gate line. The removal of the first and the second portions of the upper conductive film may include: removing the exposed portion of the upper film of the gate line to expose a portion of the lower film of the gate line.

The method may further include: forming a contact assistant on the third portion of the lower conductive film and the exposed portion of the lower film of the gate line.

The upper film of the gate line may include the same material as the upper conductive film. The upper film of the gate line and the upper conductive film may include Cr and the lower film of the gate line and the lower conductive film may include Al or Al—Nd alloy.

The pixel electrode and the redundant electrodes may include IZO.

The formation of a pixel electrode and a pair of redundant electrodes and the removal of the exposed part of the second portion of the lower conductive film may be simultaneously performed.

The formation of a pixel electrode and a pair of redundant electrodes and the removal of the exposed part of the second portion of the lower conductive film may be performed under the same etch condition.

The semiconductor layer may include an intrinsic film and an extrinsic film, and the method may further include: removing the exposed portion of the extrinsic film after removing the second portion of the lower conductive film.

A thin film transistor array panel is provided, which includes: a substrate; a gate line formed on the substrate and including lower and upper films; a gate insulating layer formed on the gate line; a semiconductor layer formed on the gate insulating layer; source and drain electrodes formed on the semiconductor layer, disposed opposite each other with respect to a first portion of the semiconductor layer, and including lower and upper films having edges that disposed adjacent to the first portion of the semiconductor layer and do not coincide with each other; a passivation layer formed on the source and the drain electrodes and having a first contact hole exposing a portion of the drain electrode and an opening exposing the first portion of the semiconductor layer; and a pixel electrode formed on the passivation layer and contacting the drain electrode through the first contact hole.

The thin film transistor array panel may further include first and second redundant electrodes disposed on the source and the drain electrodes, respectively, and including the same layer as the pixel electrode.

The opening may further expose portions of the lower films of the source and the drain electrodes.

The first and the second redundant electrodes may contact the exposed portions of the lower films of the source and the drain electrodes, respectively. The first and the second redundant electrodes may have at least an edge that coincides with an edge of the exposed portions of the lower films of the source and the drain electrodes, respectively.

The opening may have at least an edge covered by the first or the second redundant electrodes.

The first contact hole may expose a portion of the lower film of the drain electrode and a portion of the gate insulating layer adjacent thereto. The upper film of the drain electrode may have at least an edge that coincides with an edge of the first contact hole.

The thin film transistor array panel may further include an insulator disposed on the exposed first portion of the semiconductor layer. The insulator may include a columnar spacer.

The lower films of the source and the drain electrodes may include Cr and the lower films of source and the drain electrodes may include Al. The pixel electrode comprises IZO.

BRIEF DESCRIPTION OF THE DRAWINGS

The present invention will become more apparent by describing embodiments thereof in detail with reference to the accompanying drawings in which.

DETAILED DESCRIPTION OF EMBODIMENTS

Figure 1:
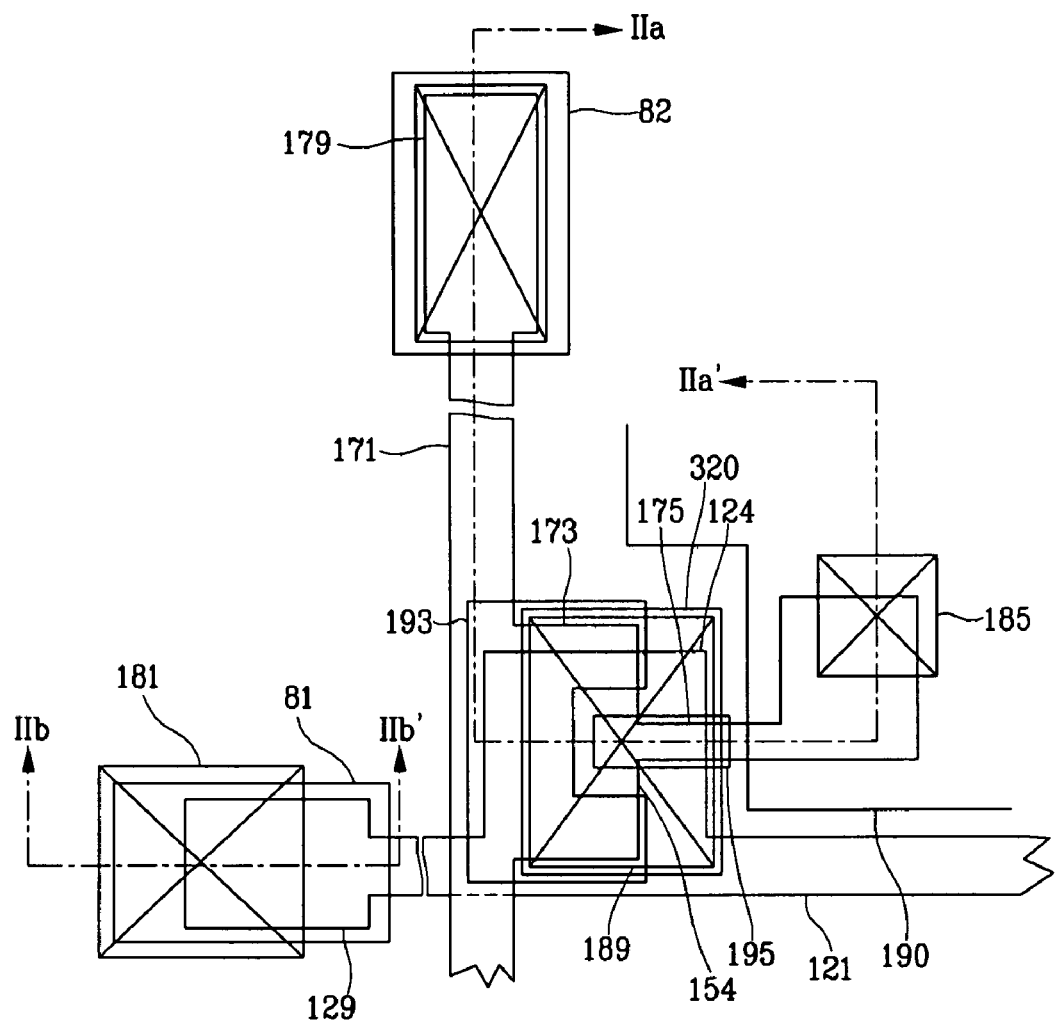
FIG. 1 is an exemplary layout view of a TFT array panel according to an embodiment of the present invention.

The present invention now will be described more fully hereinafter with reference to the accompanying drawings, in which preferred embodiments of the invention are shown. The present invention may, however, be embodied in many different forms and should not be construed as limited to the embodiments set forth herein.

In the drawings, the thickness of layers, films and regions are exaggerated for clarity. Like numerals refer to like elements throughout. It will be understood that when an element such as a layer, film, region or substrate is referred to as being "on" another element, it can be directly on the other element or intervening elements may also be present. In contrast, when an element is referred to as being "directly on" another element, there are no intervening elements present.

Now, TFT array panels and manufacturing methods thereof according to embodiments of the present invention will be described with reference to the accompanying drawings.

A TFT array panel for an LCD will be described in detail with reference to FIGS. 1, 2A and 2B.

Figure 2A:
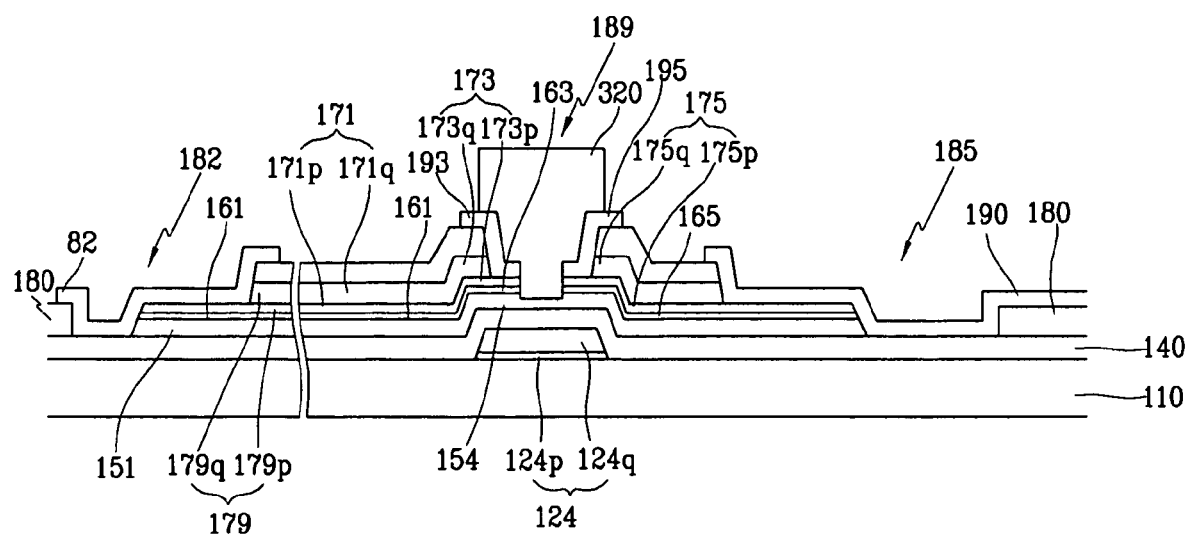
FIGS. 2A and 2B are sectional views of the TFT array panel shown in FIG. 1 taken along the lines IIa-IIa' and IIb-IIb', respectively.
Figure 2B:
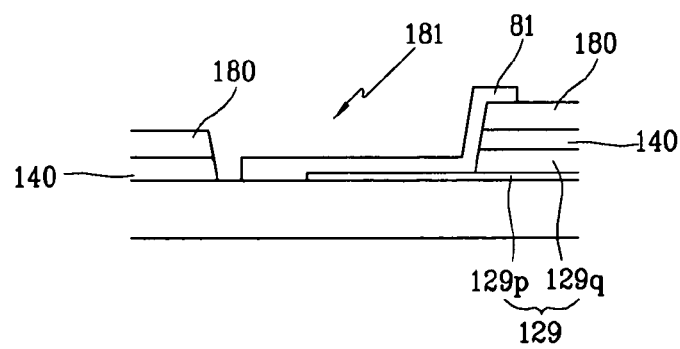

FIG. 1 is an exemplary layout view of a TFT array panel according to an embodiment of the present invention, and FIGS. 2A and 2B are sectional views of the TFT array panel shown in FIG. 1 taken along the lines IIa-IIa' and IIb-IIb', respectively.

A plurality of gate lines 121 for transmitting gate signals are formed on an insulating substrate 110. Each gate line 121 extends substantially in a transverse direction and it includes a plurality of portions projecting downward to form a plurality of gate electrodes 124 and an expanded end portion 129 having a large area for contact with another layer or an external device.

The gate lines 121 include two films having different physical characteristics, a lower film and an upper film. The upper film is preferably made of low resistivity metal including Al containing metal such as Al and Al alloy for reducing signal delay or voltage drop in the gate lines 121. On the other hand, the lower film is preferably made of material such as Cr, Mo, Mo alloy such as MoW, Ta and Ti, which has good physical, chemical, and electrical contact characteristics with other materials such as indium tin oxide (ITO) and indium zinc oxide (IZO). Good examples of combination of the lower film material and the upper film material are Cr and Al and Cr and Al—Nd alloy, which are etched under different etch conditions. In FIGS. 2A and 2B, the lower and the upper films of the gate electrodes 124 are indicated by reference numerals 124p and 124q, respectively, and the lower and the upper films of the end portions 129 are indicated by reference numerals 129p and 129q, respectively. Portions of the upper film 129q of the end portions 129 of the gate lines 121 are removed to expose the underlying portions of the lower films 129p and thus there is at least an edge of the upper film 129q disposed on the lower film 129p.

However, the gate lines 121 may have a single layer or triple or more layers.

In addition, the lateral sides of the gate lines 121 are inclined relative to a surface of the substrate 110, and the inclination angle thereof ranges about 30-80 degrees.

A gate insulating layer 140 preferably made of silicon nitride (SiNx) is formed on the gate lines 121.

A plurality of semiconductor stripes 151 preferably made of hydrogenated amorphous silicon (abbreviated to "a-Si") are formed on the gate insulating layer 140. Each semiconductor stripe 151 extends substantially in the longitudinal direction and has a plurality of projections 154 branched out toward the gate electrodes 124.

A plurality of ohmic contact stripes and islands 161 and 165 preferably made of silicide or n+ hydrogenated a-Si heavily doped with n type impurity are formed on the semiconductor stripes 151. Each ohmic contact stripe 161 has a plurality of projections 163, and the projections 163 and the ohmic contact islands 165 are located in pairs on the projections 154 of the semiconductor stripes 151.

The lateral sides of the semiconductor stripes 151 and the ohmic contacts 161 and 165 are inclined relative to a surface of the substrate 110, and the inclination angles thereof are preferably in a range of about 30-80 degrees.

A plurality of data lines 171 and a plurality of drain electrodes 175 are formed on the ohmic contacts 161 and 165.

The data lines 171 for transmitting data voltages extend substantially in the longitudinal direction and intersect the gate lines 121. Each data line 171 includes an expansion 179 having a larger area for contact with another layer or an external device.

A plurality of branches of each data line 171, which project toward the drain electrodes 175, form a plurality of source electrodes 173. Each drain electrode 175 includes one linear end portion disposed on a gate electrode 124 and partially enclosed by a source electrode 173 having a large area for contact with another layer and the other expanded end portion having a large area for contact with another layer. A gate electrode 124, a source electrode 173, and a drain electrode 175 along with a projection 154 of a semiconductor stripe 151 form a TFT having a channel formed in the projection 154 disposed between the source electrode 173 and the drain electrode 175.

The data lines 171 and the drain electrodes 175 also include a lower film 171p and 175p and an upper film 171q and 175q located thereon. Good examples of combination of the lower film material and the upper film material are Cr and Al and Cr and Al—Nd alloy, which are etched under different etch conditions. In FIGS. 2A and 2B, the lower and the upper films of the source electrodes 173 are indicated by reference numerals 173p and 173q, respectively, and the lower and the upper films of the end portions 179 are indicated by reference numerals 179p and 179q, respectively. Some portions of the lower film 173p of the source electrodes 173 and some portions of the lower film 175p of the linear end portions of the drain electrodes 175, which are disposed around the channels of the TFTs, are exposed. In addition, portions of the lower film 175p of the expanded end portions of the drain electrodes 175 and portions of the lower film 179p of the end portions 179 of the data lines 171 are also exposed and thus there is at least an edge of the upper film 175q/179q disposed on the lower film 175p/179p.

Like the gate lines 121, the data lines 171 and the drain electrodes 175 have tapered lateral sides relative to a surface of the substrate 110, and the inclination angles thereof range about 30-80 degrees.

The ohmic contacts 161 and 165 are interposed only between the underlying semiconductor stripes 151 and the overlying data lines 171 and the overlying drain electrodes 175 thereon and reduce the contact resistance therebetween. The semiconductor stripes 151 have almost the same planar shapes as the data lines 171 and the drain electrodes 175 as well as the underlying ohmic contacts 161 and 165. However, the projections 154 of the semiconductor stripes 151 include a plurality of exposed portions, which are not covered with the data lines 171 and the drain electrodes 175, such as portions located between the source electrodes 173 and the drain electrodes 175.

A passivation layer 180 is formed on the data lines 171, the drain electrodes 175, and exposed portions of the semiconductor stripes 151, which are not covered with the data lines 171 and the drain electrodes 175. The passivation layer 180 is preferably made of photosensitive organic material having a good flatness characteristic, low dielectric insulating material such as a-Si:C:O and a-Si:O:F formed by plasma enhanced chemical vapor deposition (PECVD), or inorganic material such as silicon nitride and silicon oxide.

The passivation layer 180 has a plurality of contact holes 182 and 185 exposing the end portions 179 of the data lines 171 and the drain electrodes 175, respectively. The passivation layer 180 and the gate insulating layer 140 have a plurality of contact holes 181 exposing the end portions 129 of the gate lines 121. Furthermore, the passivation layer 180 has a plurality of openings 189 exposing the exposed portions of the projections 154 of the semiconductor stripes 151 in the TFTs and the exposed portions of the lower films 173p and 175p disposed around the exposed portions of the projections 154.

The contact holes 181, 182 and 185 expose the lower films 129p, 179p and 175p. The edges of the upper films 129q, 179q and 175q disposed on the lower films 129p, 179p and 175p substantially coincide with boundaries of the contact holes 181, 182 and 185 and the openings 189. In addition, the contact holes 181 expose edges of the end portions 129 of the gate lines 121 and some portions of the substrate 110, and the contact holes 182/185 expose edges of the end portions 179 of the data lines 171/the drain electrodes 175 and some portions of the gate insulating layer 140.

A plurality of pixel electrodes 190, a plurality of redundant source electrodes 193 and redundant drain electrodes 195, and a plurality of contact assistants 81 and 82, which are preferably made of IZO, are formed on the passivation layer 180.

The pixel electrodes 190 are physically and electrically connected to the drain electrodes 175 through the contact holes 185 such that the pixel electrodes 190 receive the data voltages from the drain electrodes 175. The pixel electrodes 190 fully cover the exposed portions of the drain electrodes 175.

The pixel electrodes 190 supplied with the data voltages generate electric fields in cooperation with a common electrode (not shown) on another panel (not shown), which reorient liquid crystal molecules in a liquid crystal layer (not shown) disposed therebetween.

A pixel electrode 190 and a common electrode form a liquid crystal capacitor, which stores applied voltages after turn-off of the TFT. An additional capacitor called a "storage capacitor," which is connected in parallel to the liquid crystal capacitor, may be provided for enhancing the voltage storing capacity. The storage capacitors are implemented by overlapping the pixel electrodes 190 with the gate lines 121 adjacent thereto (called "previous gate lines") or with separately provided storage electrodes (not shown). The capacitances of the storage capacitors, i.e., the storage capacitances are increased by increasing overlapping areas or by providing conductors, which are connected to the pixel electrodes 190 and overlap the gate lines 121 or the storage electrodes, under the pixel electrodes 190 for decreasing the distance between the terminals.

The pixel electrodes 190 may overlap the gate lines 121 and the data lines 171 to increase aperture ratio.

The redundant source electrodes 193 and the redundant drain electrodes 195 are disposed on the source and the drain electrodes 173 and 175, respectively and they contact the exposed portions of the lower films 173p and 175p of the source and the drain electrodes 173 and 175 through the openings 189. The redundant electrodes 193 and 195 cover the exposed portions of the lower films 173p and 175p of the source and the drain electrodes 173 and 175 in the openings 189 and they have inner edges that face each other and coincide with the edges of the lower films 173p and 175p.

The contact assistants 81/82 are connected to the exposed expansions 129/179 of the gate lines 121/the data lines 171 through the contact holes 181/182 and the contact holes 81 and 82 fully cover the exposed expansions 129 and 179. The contact assistants 81 and 82 protect the exposed portions 129 and 179 and complement the adhesion between the exposed portions 129 and 179 and external devices.

In the meantime, the exposure of the edges of the lower films 129p, 179p and 175p of the end portions 129 of the gate lines 121, the end portions 179 of the data lines 171, and the expanded end portions of the drain electrodes 175 through the contact holes 181, 182 and 185 prevents the disconnection of the contact assistants 81 and 82 and the pixel electrodes 190 at the contact holes 181, 182 and 185. For example, portions of the pixel electrodes 190 near an edge of the contact hole 185 disposed on the lower film 175p may be disconnected due to the undercut of the upper film 175q at the edge of the contact hole 185. The undercut means that a portion of the upper film 175q under the passivation layer 180 at the edge of the contact hole 185 is removed to place the boundary of the upper film 175q under the passivation layer 180 such that the sidewall of the contact hole 185 has a hole or a depression as shown in FIG. 2A. However, the other edge of the contact hole 185 disposed directly on the gate insulating layer 140 does not have such undercut. Accordingly, the pixel electrodes 190 contact the drain electrodes 175 with a smooth profile, thereby securing the reliable contact therebetween.

A plurality of columnar spacers 320 preferably made of photosensitive organic material stand on the exposed portions of the semiconductor stripes 151 and on the passivation layer 180. The spacers 320 sustain a gap between the TFT array panel and the common electrode panel and protect the exposed portions of the semiconductor stripes 151. The spacers 320 may include a silicon nitride film.

The pixel electrodes 190 may be made of ITO or transparent conductive polymer. For a reflective LCD, the pixel electrodes 190 are made of opaque reflective metal. In these cases, the contact assistants 81 and 82 may be made of material such as ITO or IZO different from the pixel electrodes 190.

A method of manufacturing the TFT array panel shown in FIGS. 1, 2A and 2B according to an embodiment of the present invention will be now described in detail with reference to FIGS. 3 to 12B as well as FIGS. 1, 2A and 2B.

Figure 3:
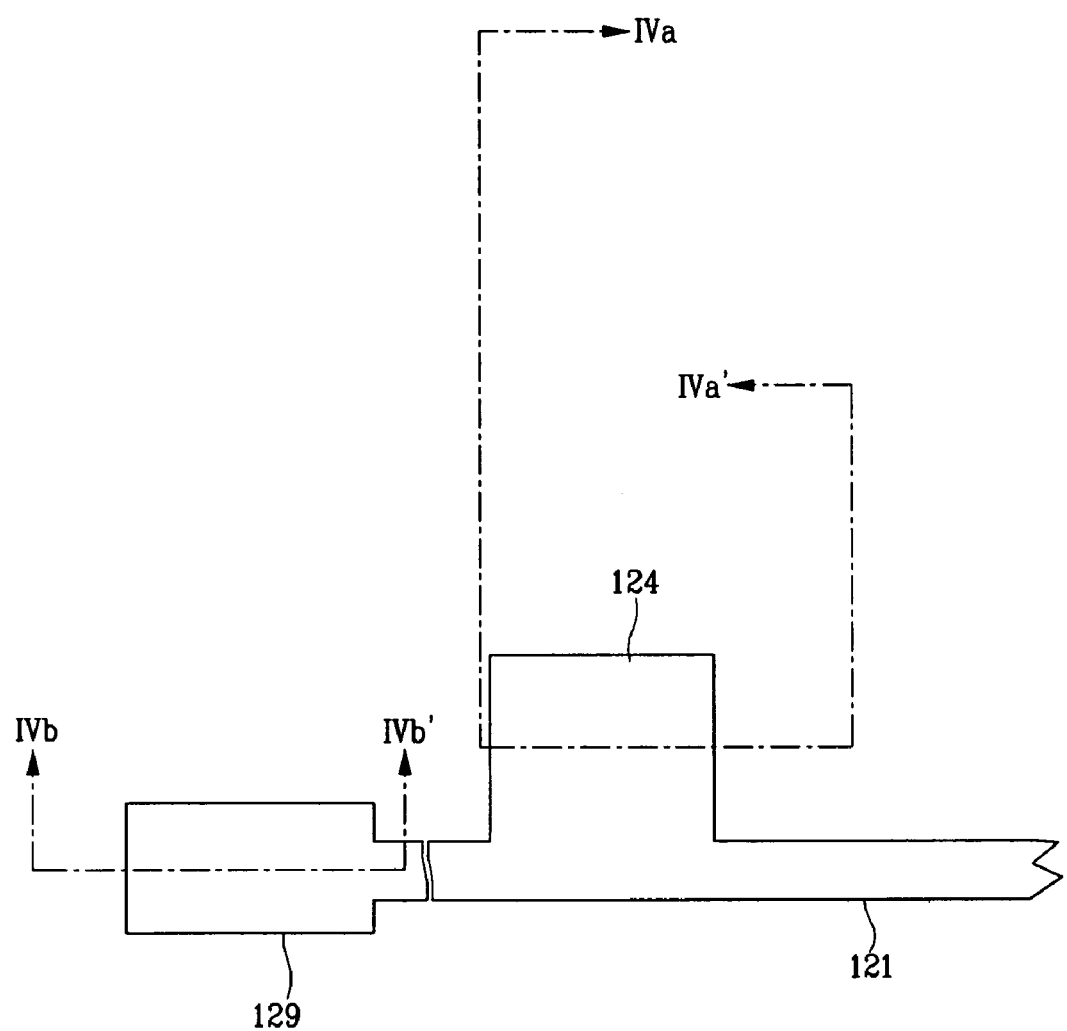
FIG. 3 is a layout view of a TFT array panel shown in FIGS. 1, 2A and 2B in the first step of a manufacturing method thereof according to an embodiment of the present invention.
Figure 4A:
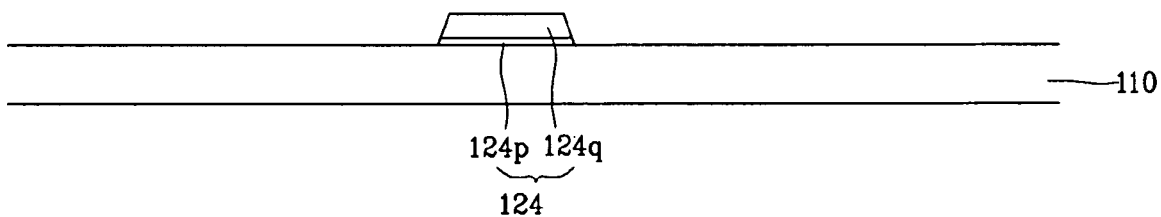
FIGS. 4A and 4B are sectional views of the TFT array panel shown in FIG. 3 taken along the lines IVa-IVa' and IVb-IVb', respectively.
Figure 4B:
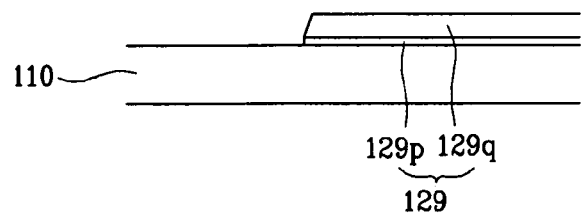
Figure 5:
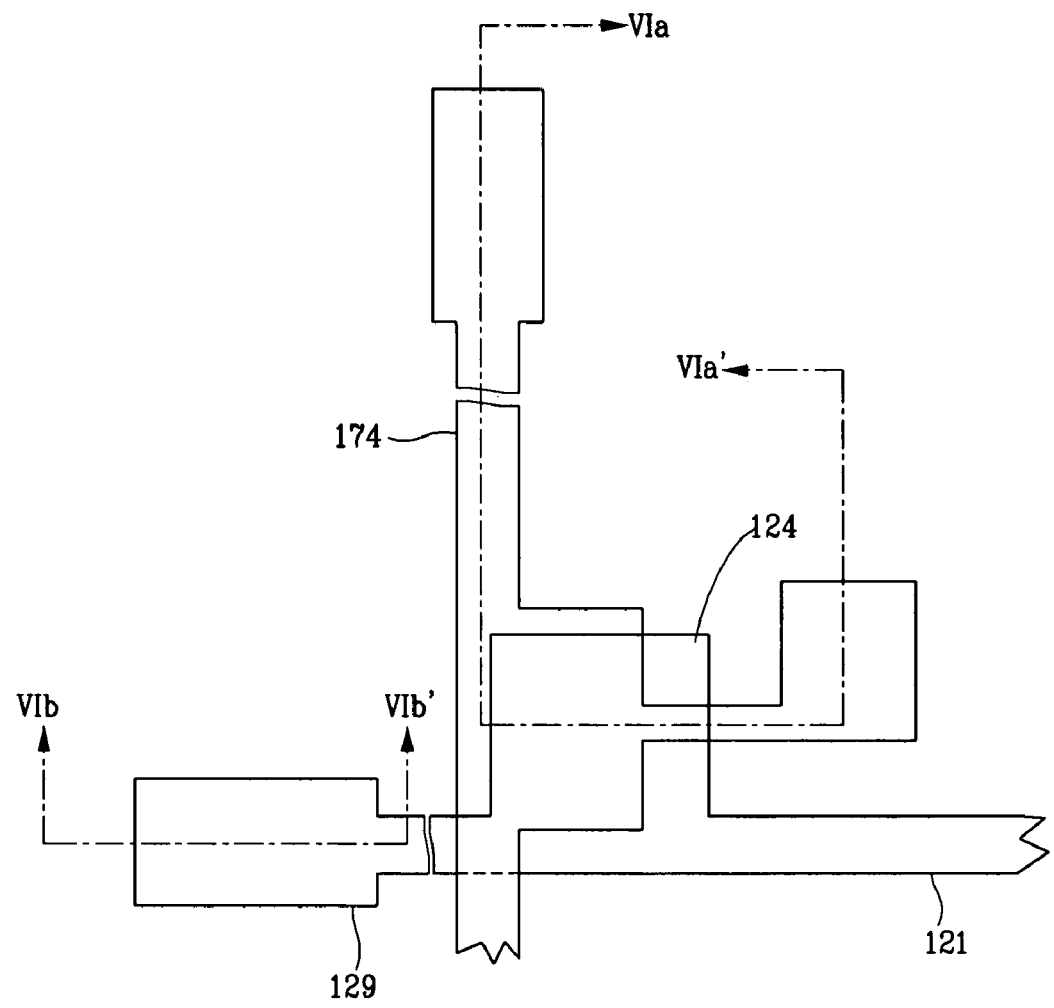
FIG. 5 is a layout view of the TFT array panel in the step following the step shown in FIGS. 3-4B.
Figure 6A:
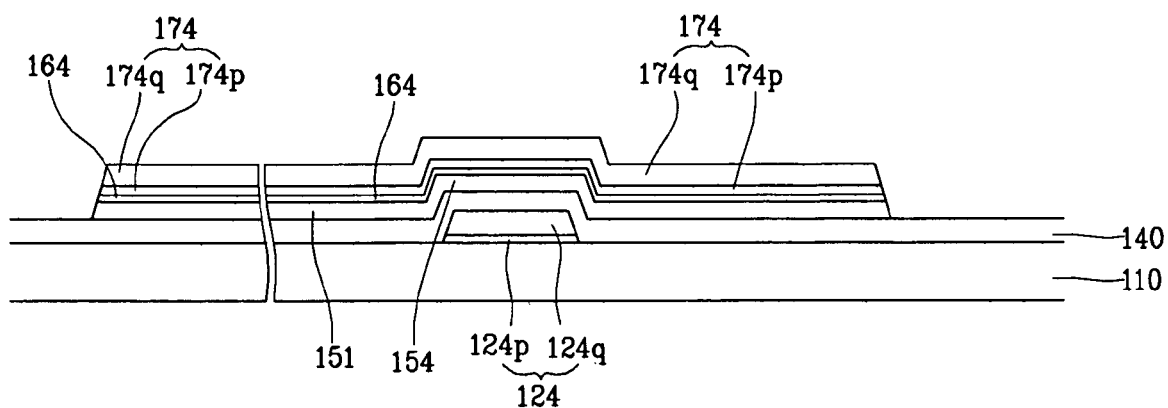
FIGS. 6A and 6B are sectional views of the TFT array panel shown in FIG. 5 taken along the lines VIa-VIa' and VIb-VIb', respectively.
Figure 6B:
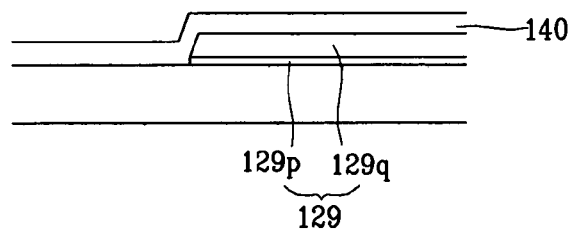
Figure 7:
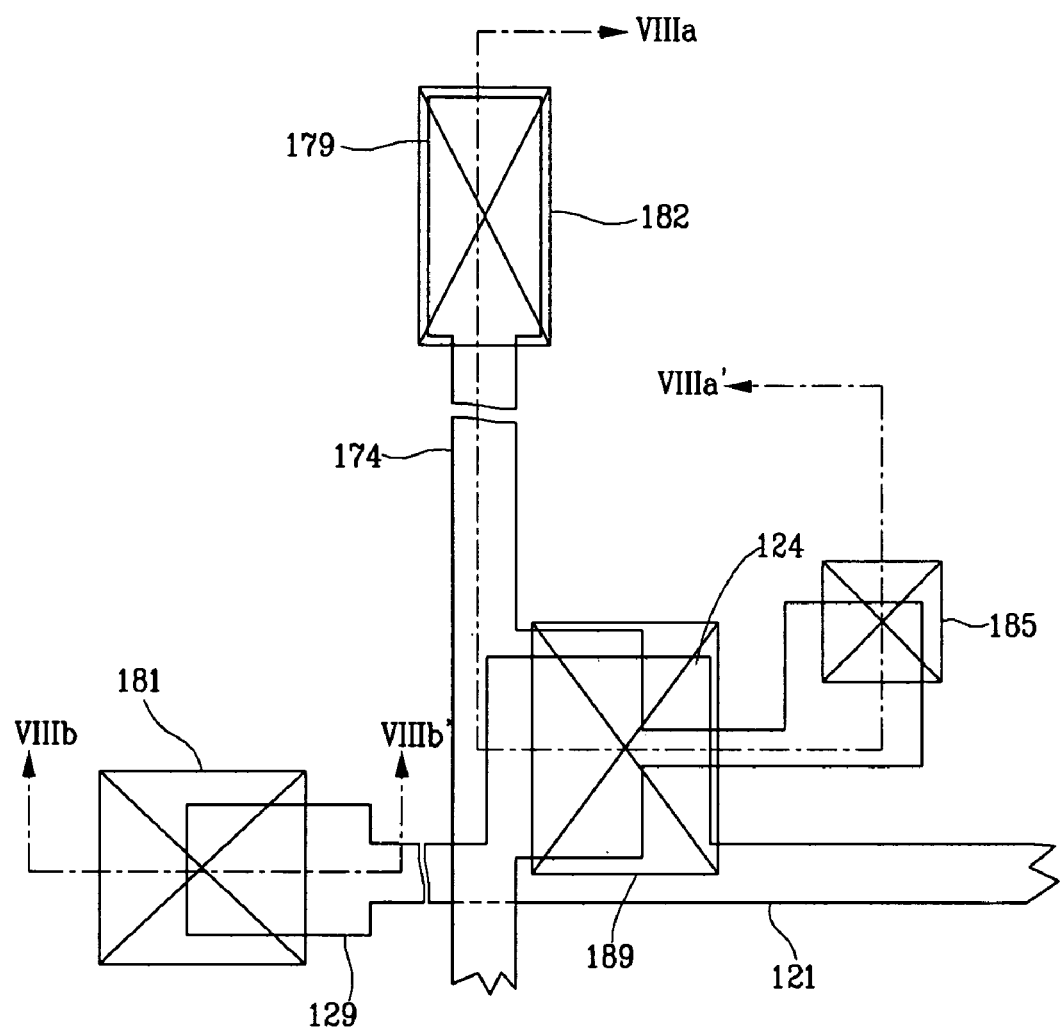
FIG. 7 is a layout view of the TFT array panel in the step following the step shown in FIGS. 5-6B.
Figure 8A:
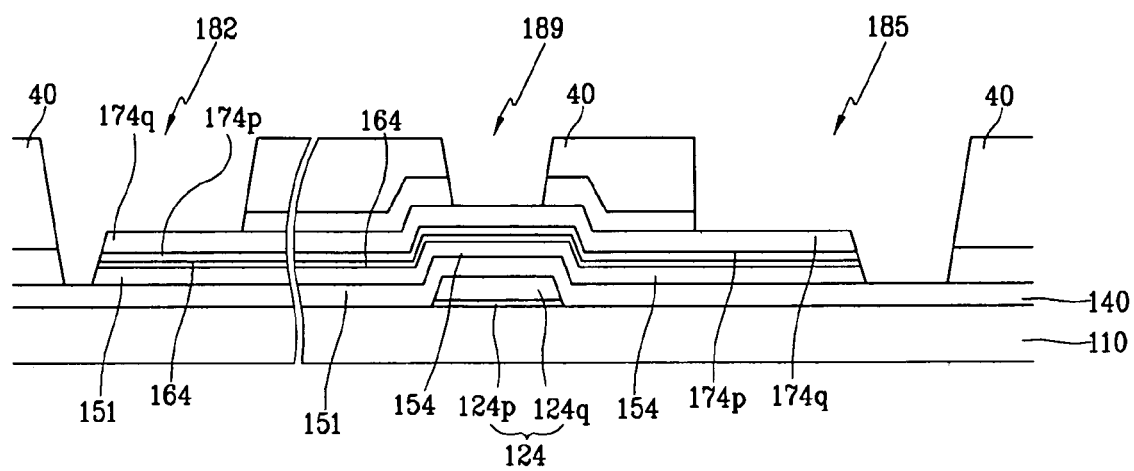
FIGS. 8A and 8B are sectional views of the TFT array panel shown in FIG. 7 taken along the lines VIIIa-VIIIa' and VIIIb-VIIIb', respectively.
Figure 8B:
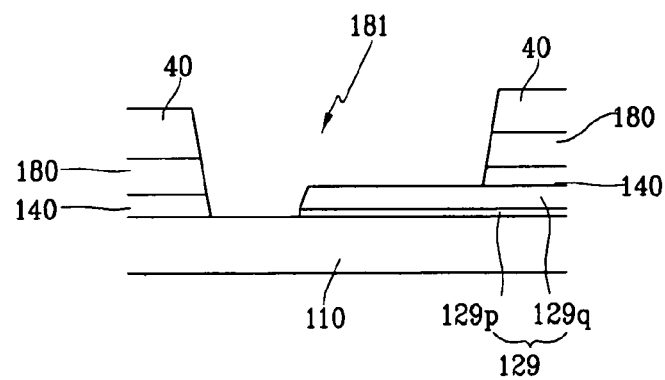
Figure 9A:
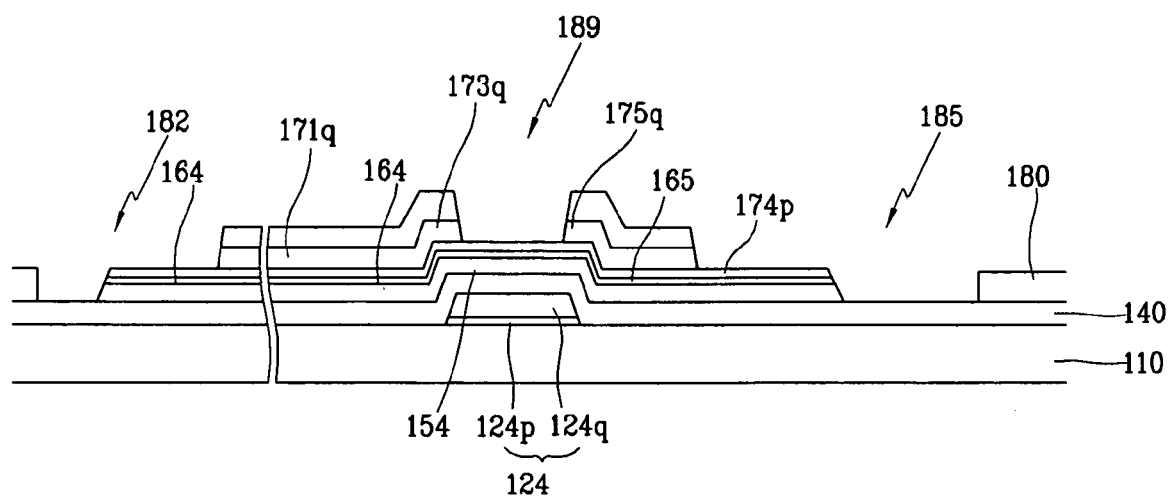
FIGS. 9A and 9B are sectional views of the TFT array panel shown in FIG. 7 taken along the lines VIIIa-VIIIa' and VIIIb-VIIIb', respectively, and illustrate the step following the step shown in FIGS. 8A and 8B.
Figure 9B:
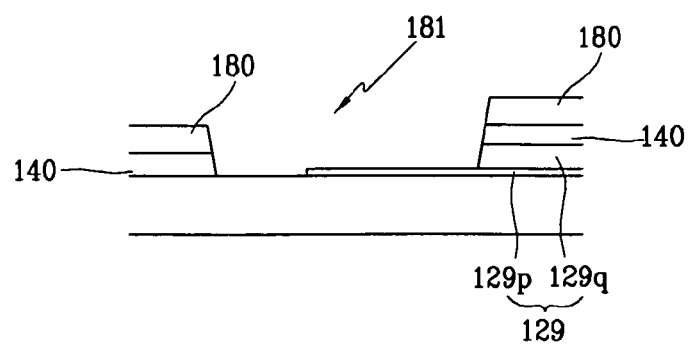
Figure 10:
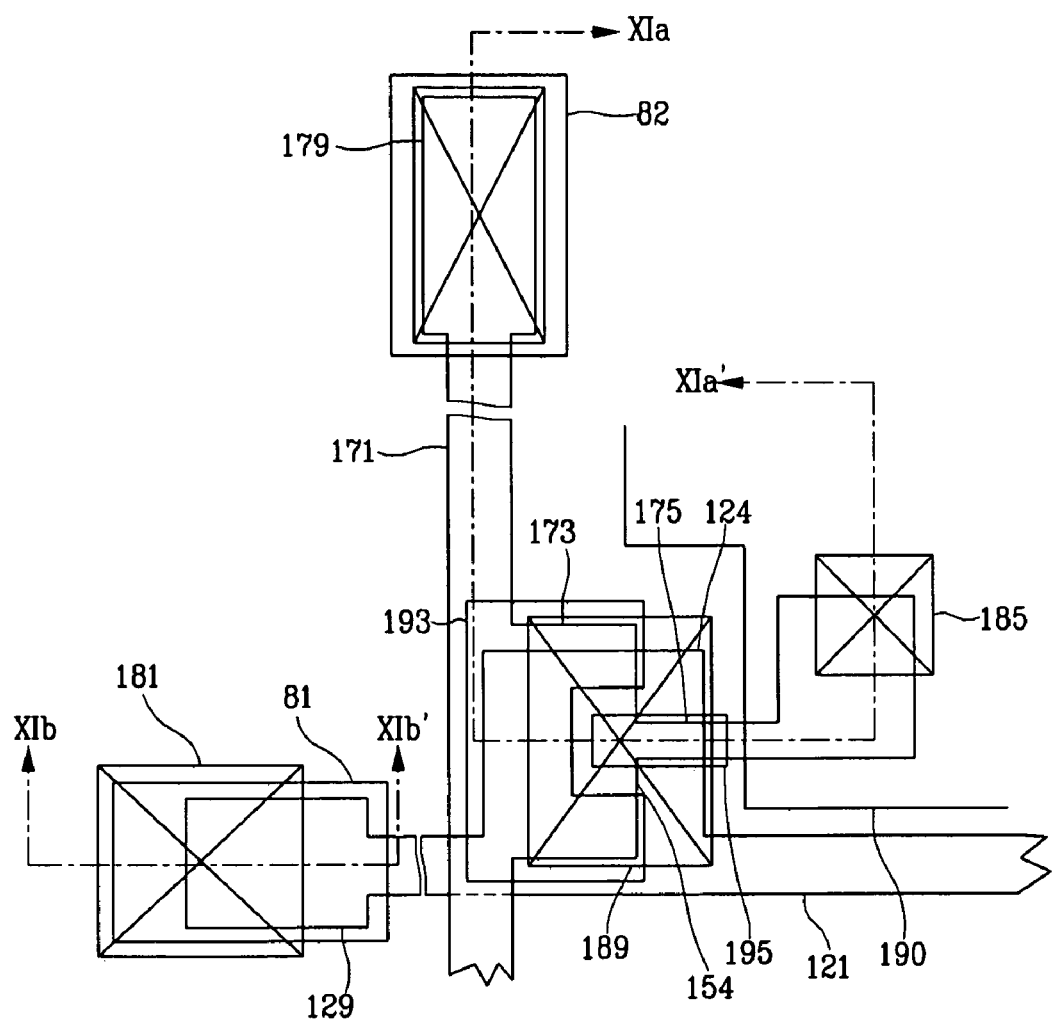
FIG. 10 is a layout view of the TFT array panel in the step following the step shown in FIGS. 9A and 9B.
Figure 11A:
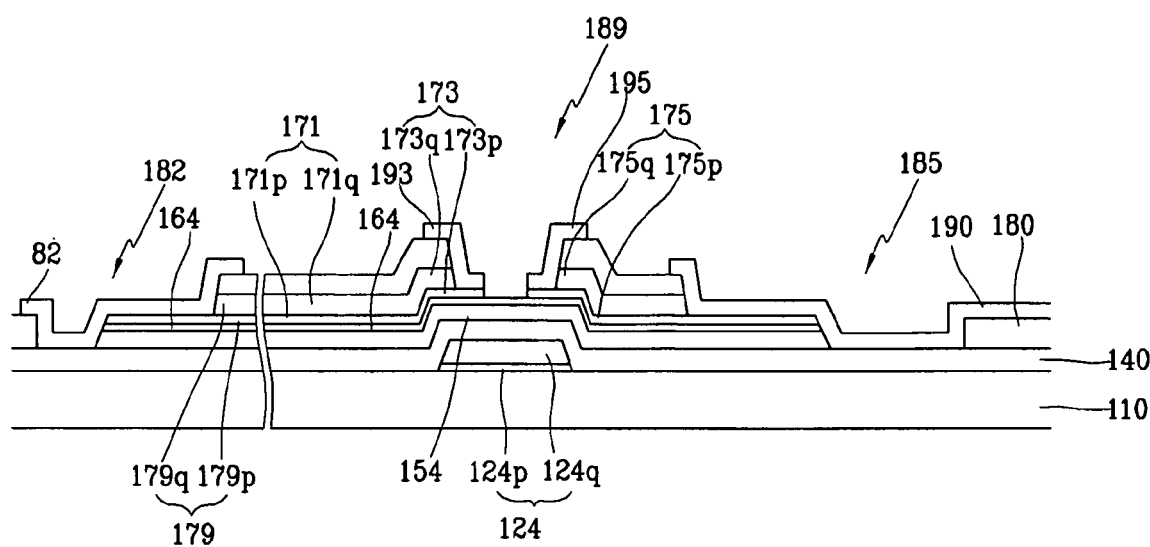
FIGS. 11A and 11B are sectional views of the TFT array panel shown in FIG. 10 taken along the lines XIa-XIa' and XIb-XIb', respectively.
Figure 11B:
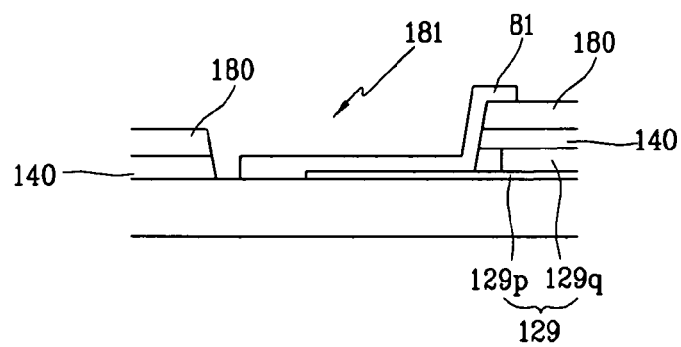
Figure 12A:
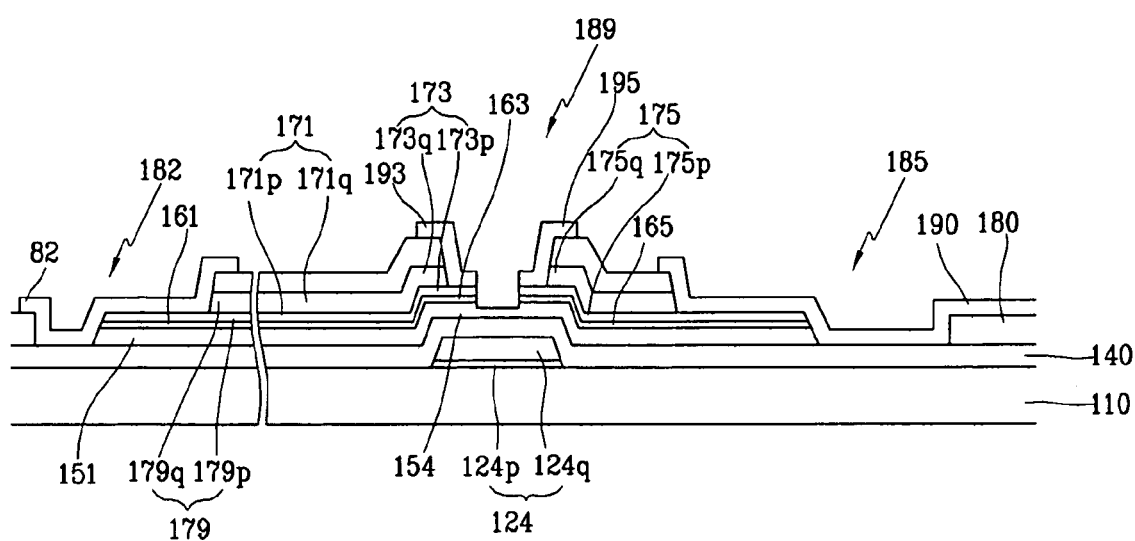
FIGS. 12A and 12B are sectional views of the TFT array panel shown in FIG. 10 taken along the lines XIa-XIa' and XIb-XIb', respectively, and illustrate the step following the step shown in FIGS. 11A and 11B.
Figure 12B:
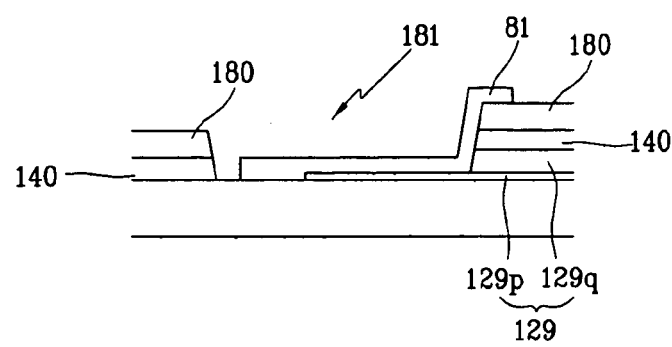

FIG. 3 is a layout view of a TFT array panel shown in FIGS. 1, 2A and 2B in the first step of a manufacturing method thereof according to an embodiment of the present invention; FIGS. 4A and 4B are sectional views of the TFT array panel shown in FIG. 3 taken along the lines IVa-IVa' and IVb-IVb', respectively; FIG. 5 is a layout view of the TFT array panel in the step following the step shown in FIGS. 3-4B; FIGS. 6A and 6B are sectional views of the TFT array panel shown in FIG. 5 taken along the lines VIa-VIa' and VIb-VIb', respectively; FIG. 7 is a layout view of the TFT array panel in the step following the step shown in FIGS. 5-6B; FIGS. 8A and 8B are sectional views of the TFT array panel shown in FIG. 7 taken along the lines VIIIa-VIIIa' and VIIIb-VIIIb', respectively; FIGS. 9A and 9B are sectional views of the TFT array panel shown in FIG. 7 taken along the lines VIIIa-VIIIa' and VIIIb-VIIIb', respectively, and illustrate the step following the step shown in FIGS. 8A and 8B; FIG. 10 is a layout view of the TFT array panel in the step following the step shown in FIGS. 9A and 9B; FIGS. 11A and 11B are sectional views of the TFT array panel shown in FIG. 10 taken along the lines XIa-XIa' and XIb-XIb', respectively; and FIGS. 12A and 12B are sectional views of the TFT array panel shown in FIG. 10 taken along the lines XIa-XIa' and XIb-XIb', respectively, and illustrate the step following the step shown in FIGS. 11A and 11B.

Referring to FIGS. 3-4B, a plurality of gate lines 121 including a plurality of gate electrodes 124 are formed on an insulating substrate 110 such as transparent glass. The gate lines 121 include two conductive films, a lower conductive film preferably made of Cr and having a thickness of about 500 Å and an upper conductive film preferably made of Al and having a thickness of about 1,000-3,000 Å, preferably about 2,500 Å.

Referring to FIGS. 5-6B, a gate insulating layer 140, an intrinsic a-Si layer, an extrinsic a-Si layer, and a conductive layer including a lower conductive film and an upper conductive film are deposited in sequence by CVD and sputtering and the conductive layer, the extrinsic a-Si layer, and the intrinsic a-Si layer are photo-etched to form a plurality of conductors 174 including upper and lower conductors 174q and 174p, a plurality of extrinsic semiconductor stripes 164, and a plurality of intrinsic semiconductor stripes 151 including a plurality of projections 154 on the gate insulating layer 140.

The gate insulating layer 140 is preferably made of silicon nitride with thickness of about 2,000 Å to about 5,000 Å, and the deposition temperature is preferably in a range of about 250-500° C. The intrinsic a-Si layer and the extrinsic a-Si layer have thickness of about 500-600 Å. The lower conductive film preferably made of Cr and having a thickness of about 500 Å and the upper conductive film preferably made of Al and having a thickness of about 1,000 Å, preferably about 2,500 Å. A sputtering target for the upper conductive film is preferably Al or Al—Nd containing about 2 atomic % of Nd and a sputtering temperature is about 150° C.

Referring to FIGS. 7-9B, a passivation layer 180 preferably having a thickness larger than about 3,000 Å is deposited and a photoresist 40 is formed. The passivation layer 180 and the gate insulating layer 140 are etched using the photoresist 40 as an etch mask to form a plurality of contact holes 181, 182 and 185 and a plurality of openings 189.

In detail, the photoresist 40 initially has a position dependent thickness such that portions (not shown) on the contact holes 182 and 185 and the openings 189 have smaller thickness than other portions, and there is substantially no photoresist on the contact holes 181. Portions of the passivation layer 180 and the gate insulating layer 140, which are not covered with the photoresist 40, are removed to form the contact holes 181 exposing the upper film 129q of the end portions 129 of the gate lines 121 and the upper conductors 174q. At this time, the portions of the photoresist 40 having the smaller thickness prevent portions of the gate insulating layer 140 disposed in the contact holes 182 and 185 and the openings 189 from being removed so that the portions of the gate insulating layer 140 near the edges of the conductors 174 may not be overcut. Thereafter, portions of the photoresist 40 on the contact holes 182, 185 and the openings 189 are removed to expose underlying portions of the passivation layer 180 and the exposed portions of the passivation layer 180 are removed to form the contact holes 182, 185 and the openings 189 as shown in FIGS. 8A and 8B. After or before removing the photoresist 40, the exposed portions of the upper conductors 174q and the upper film 129q are removed to expose the lower conductors 174p and the lower film 129p and to complete the upper films 171q and 175q of the end portions 179 and the drain electrodes 175 as shown in FIGS. 9A and 9B. The etch condition for etching the upper conductors 174q and the upper film 129q is determined so that the lower conductors 174p and the lower film 129p may not be etched. At this time, the undercut of the upper conductors 174$q$ and the upper film 129$q$ may be formed as shown in FIGS. 9A and 9B.

Referring to FIGS. 10-11B, an IZO layer having a thickness of about 400-500 Å is sputtered and photo-etched to form a plurality of pixel electrodes 190, a plurality of redundant source electrodes 193 and redundant drain electrodes 195, and a plurality of contact assistants 81 and 82. An example of commercially available sputtering target for IZO is IDIXO (indium x-metal oxide) produced by Idemitsu in Japan. The sputtering target may include $In_2O_3$ and ZnO and the content of Zn among In and Zn preferably ranges about 15-20 atomic %. In addition, the sputtering temperature for Zn is preferably lower than about 250° C. and IZO can be etched by oxalic acid.

The contact assistants 81 and 82, the redundant electrodes 193 and 195, and the pixel electrodes 190 cover the exposed portions of the lower conductors 129$p$ exposed through the contact holes 181, the exposed portions of the lower conductors 174$p$ exposed through the contact holes 182, the exposed portions of the gate insulating layer 140 exposed through the contact holes 182 and 185 and the openings 189, and some of the exposed portions of the lower conductors 174$p$ exposed through the openings 189. However, the other of the exposed portions of the lower conductors 174$p$ exposed through the contact holes 189 are not covered yet. The exposed portions of the lower conductors 174$p$ are removed by blanket etch to expose the extrinsic semiconductor stripes 164 and to complete the lower films 171$p$ and 175$p$ of the data lines 171 and the drain electrodes 175. The IZO layer and the exposed portions of the lower conductors 174$p$ are simultaneously removable by using a Cr etchant. The redundant electrodes 193 and 195 facilitate the control of the length and the width of TFTs.

Referring to FIGS. 12A and 12B, the exposed portions of the extrinsic semiconductor stripes 164, which are not covered with the data lines 171 and the drain electrodes 175, are removed by blanket etch to complete a plurality of ohmic contact stripes 161 including a plurality of projections 163 and a plurality of ohmic contact islands 165 and to expose portions of the intrinsic semiconductor stripes 151.

Oxygen plasma treatment may follow thereafter in order to stabilize the exposed surfaces of the semiconductor stripes 151.

Finally, a plurality of columnar spacers 320 preferably made of inorganic insulator such as silicon nitride and silicon oxide are formed on the exposed portions of the semiconductor stripes 151 as shown in FIGS. 1-2B. The columnar spacers 320 may be made of photosensitive material and this can simplify the process since the thickness of the photosensitive film can be adjusted by controlling rotational speed of a spin coating device.

The above-describe method separates the source electrodes 173 and the drain electrodes 175 using the passivation layer 180, the redundant electrodes 193 and 195, the contact assistants 81 and 82, and the pixel electrodes 190, thereby reducing the number of photolithography steps. Accordingly, the manufacturing method is simplified to reduce the production cost and the productivity.

In addition, the width and the length of the channels of the TFTs can be easily controlled by using the redundant electrodes 193 and 195. Furthermore, the embodiments prevent the disconnection of the contact assistants 81 and 82 and the pixel electrodes 190 by making the contact holes 181, 182 and 185 expose edges of the gate lines 121, the data lines 171, and the drain electrodes 175. Moreover, the slit mask prevents the portions of the gate insulating layer 140 from being removed in the contact holes 182 and 185 and the openings 189, thereby prevent the disconnection due to the under of the gate insulating layer.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. A method of manufacturing a thin film transistor array panel, the method comprising:

forming a gate line on a substrate;

depositing a gate insulating layer and a semiconductor layer in sequence on the gate line;

depositing a lower conductive film and an upper conductive film on the semiconductor layer;

photo-etching the upper conductive film, the lower conductive film, and the semiconductor layer;

depositing a passivation layer;

photo-etching the passivation layer to expose first and second portions of the upper conductive film;

removing the first and the second portions of the upper conductive film to expose first and second portions of the lower conductive film;

forming a pixel electrode and a pair of redundant electrodes on the first and the second portions of the lower conductive film, respectively, the redundant electrodes exposing a part of the second portion of the lower conductive film;

removing the exposed part of the second portion of the lower conductive film to expose a portion of the semiconductor layer; and forming a columnar spacer on the exposed portion of the semiconductor layer.

2. The method of claim 1, wherein the photo-etching of the passivation layer comprises:

exposing the first portion of the upper conductive film and a portion of the gate insulating layer adjacent to the first portion.

3. The method of claim 2, wherein the exposed portion of the gate insulating layer is covered with the pixel electrode along with the first portion of the lower conductive film.

4. The method of claim 3, wherein the photo-etching of the passivation layer further comprises:

exposing a third portion of the upper conductive film.

5. The method of claim 4, wherein the removal of the first and the second portions of the upper conductive film comprises:

removing the third portion of the upper conductive film to expose a third portion of the lower conductive film.

6. The method of claim 5, wherein the gate line comprises a lower film and an upper film.

7. The method of claim 6, wherein the photo-etching of the passivation layer further comprises:

etching the gate insulating layer to expose a portion of the upper film of the gate line.

8. The method of claim 7, wherein the removal of the first and the second portions of the upper conductive film comprises:

removing the exposed portion of the upper film of the gate line to expose a portion of the lower film of the gate line.

9. The method of claim 7, further comprising:

forming a contact assistant on the third portion of the lower conductive film and the exposed portion of the lower film of the gate line.

10. The method of claim 9, wherein the upper film of the gate line comprises the same material as the upper conductive film.

11. The method of claim 10, wherein the upper film of the gate line and the upper conductive film comprises Cr and the lower film of the gate line and the lower conductive film comprises Al or Al-Nd alloy.

12. The method of claim 11, wherein the pixel electrode and the redundant electrodes comprise IZO.

13. The method of claim 12, wherein the formation of a pixel electrode and a pair of redundant electrodes and the removal of the exposed part of the second portion of the lower conductive film are simultaneously performed.

14. The method of claim 12, wherein the formation of a pixel electrode and a pair of redundant electrodes and the removal of the exposed part of the second portion of the lower conductive film are performed under the same etch condition.

15. The method of claim 1, wherein the semiconductor layer comprises an intrinsic film and an extrinsic film, and the method further comprises:

removing the exposed portion of the extrinsic film after removing the second portion of the lower conductive film.

* * * * *